July 23, 1963   D. C. MEYERS   3,098,523
METHOD AND APPARATUS FOR PRODUCING HIGH-PRESSURE WELLS
Filed May 27, 1960

INVENTOR
D.C. MEYERS
BY J. H. McCarthy
HIS AGENT

United States Patent Office 3,098,523
Patented July 23, 1963

3,098,523
METHOD AND APPARATUS FOR PRODUCING HIGH-PRESSURE WELLS
Douglas C. Meyers, Metairie, La., assignor to Shell Oil Company, New York, N.Y., a corporation of Delaware
Filed May 27, 1960, Ser. No. 32,327
4 Claims. (Cl. 166—45)

This invention relates to a method and apparatus for producing a high-pressure well and pertains more particularly to a method and apparatus for producing a multi-phase emulsifiable well fluid of oil and water, or gas, oil and water from a high-pressure well into a chamber of substantially lower pressure forming a separator device for separating the various phases of the well production fluid.

In many oil fields, hydrocarbons exist in the producing formation under high pressure. When a well is drilled into a high-pressure formation of this type, the production fluid obtained therefrom normally consists of a hydrocarbon fluid and water under pressure. In some wells the multi-phase production fluid consists of oil, gas and water whereas in other wells under high pressure the gas phase of the production fluid within the formation and within the well is often in liquid form until the pressure of the production fluid has been reduced upon leaving the well. At this time a portion of the oil phase of the production fluid would become gas.

In order to control the flow rate of production fluid from a high-pressure well and reduce the pressure thereof, the production flowline from a wellhead assembly is normally provided with a flow control device, known as a choke, which may be either fixed or adjustable. Fluid produced from high-pressure wells is normally in the form of an emulsion which is flowed through a pipe to a chamber or tank where it is treated in some suitable manner in order to break the emulsion.

It has been fairly well established that the formation of an oil-water emulsion from a flowing oil well is caused primarily by the conventional flow control device in the production line from the well, when the pressure reduction of the fluid stream exceeds that which produces a critical velocity of the stream as the stream passes through the flow control device. The flow control device may be in the form of either a single, fixed or adjustable choke, an orifice, or a valve. Critical velocity for gas is reached when the reduced pressure or the pressure downstream of the flow control device is less than .52 to .58 that of the pressure upstream of the flow control device. Since gas is produced from oil wells along with the oil and water, a pressure drop greater than that which would cause critical velocity, causes the produced gas to exit from the restriction of the flow control device with an internal pressure greater than the downstream pressure so that the gas more or less explodes from the exit of the flow control device and causes the water and oil to be broken into extremely small droplets, in much the same manner as an atomizer or sprayer, and produces a homogeneous mixture or emulsion of oil and water which becomes difficult to separate or "break" except by the application of heat, the addition of chemicals, or other treating methods. It has been found that oil and water do not become homogenized or emulsified if the pressure drop across the flow control device or other restriction is maintained at less than that which causes critical velocity of the gas, thus allowing the oil and water to be separated quite easily.

It is therefore a primary object of the present invention to provide a method and apparatus for producing a multi-phase emulsifiable fluid of gas, oil and water from a high-pressure well and flow it to a low pressure separator apparatus without substantial emulsification of the multi-phase production fluid.

Another object of the present invention is to provide an apparatus for producing a multi-phase emulsifiable production fluid of oil, gas and water from a high-pressure well in a manner which pressure variations on the supply side of a flow control device are used to modulate the flow on the discharge side of the flow control device to maintain the same pressure ratio across a flow control device independent of any change of flow rate of the fluid stream passing therethrough.

These and other objects of this invention will be understood from the following description when taken with reference to the attached drawing, wherein.

Figure 1:
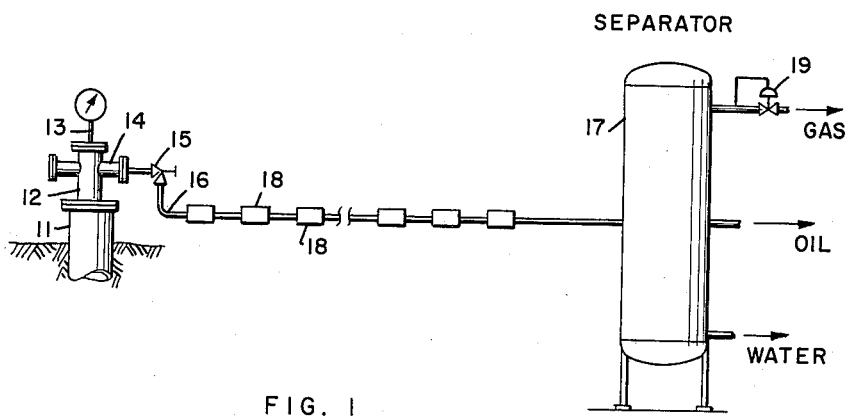
FIGURE 1 is a schematic view showing a wellhead with a production flowline connected to a separator.

The method of producing a multi-phase emulsifiable fluid of oil, gas and water from a high-pressure well in accordance with the present invention contemplates the drilling of a well in a high-pressure field and containing the production fluid in the well with a suitable wellhead closure device equipped with a production discharge line through which production fluid may be discharged from the well while controlling the flow of the fluid stream and reducing the pressure of the fluid stream between the well and an oil and gas separator. The rate of pressure reduction of the flow stream is preferably controlled in a plurality of stepwise stages wherein the ratio of the pressure downstream of each stage to the pressure upstream thereof is a value above that at which emulsification and atomization takes place within a multi-phase fluid which may then be discharged into a chamber at a reduced pressure where it is subsequently separated into the various phases. Referring to FIGURE 1 of the drawing, the top of a well casing 11 is shown as being closed by a wellhead assembly which may include a Christmas tree 12 having a pressure gauge 13 and a production discharge arm 14. A fluid flow controller 15, preferably one of the choke type, is attached to the end of the production discharge line 14 for controlling the rate of flow from the well. A production flowline 16 connects the discharge end of the flow controller 15 with a fluid separator tank 17. One or more pressure reduction devices 18 is operatively connected in the production flowline 16 between the choke 15 and the separator 17, a back-pressure valve 19 being preferably mounted in the gas discharge line of the separator and adjusted to a pressure at which the separator tank 17 operates.

Figure 2:
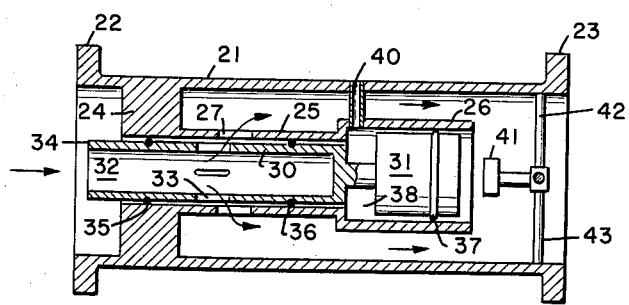
FIGURE 2 is a view taken in longitudinal cross-section of a flow control device of the present invention.

In FIGURE 2 of the drawing, one form of a pressure reduction device 18 (FIGURE 1) is illustrated. The pressure reduction device comprises a housing 21 having flanges 22 and 23 at the ends thereof for connection into a pipeline. Fixedly mounted in a fluidtight manner transversely in said housing 21 is a plate 24 having a cylinder 25 extending downstream thereof, the downstream end 26 of the cylinder 25 being of enlarged diameter. The cylinder 25 is provided with fluid port means through the wall thereof downstream of the plate 24.

Slidably mounted within the cylinder 25—26 is a piston type valve 30 having the downstream end thereof enlarged, as at 31. A portion of the slidable valve 30 has an axial bore 32 therethrough. Fluid ports are provided through the wall of the valve 30 so as to be at least in partial register with the fluid ports 27 of the cylinder 25 when the valve 30 is in its operative position within the cylinder 25. Thus, the portion of the bore 32 between the upstream end 34 of the valve 30 and the fluid ports 33 forms conduit means in communication between the upstream and downstream sides of a plate 24 through ports 27 and 33. Suitable sealing means such as O-ring seals 35 and 36 are provided between the outside surface of the valve 30 and the inner wall of the cylinder 25 on opposite sides of the ports 27 and 33 to seal the valve 30 in fluidtight engagement within the cylinder 25. Another sealing ring 37 is installed within the present apparatus between the outer surface of the enlarged portion 31 of the valve 30 and the inner wall of the enlarged portion 26 of the cylinder 25 so as to seal between the two elements in a fluidtight manner and form an isolated space 38 between seals 36 and 37 and between the valve 30—31 and the cylinder 25—26. This space 38 is in communication through a flow passageway or conduit 40 with the space outside the housing 21. If desired, a stop member 41 is centrally positioned within the housing 21 by means of radially-extending arms 42 and 43 which are fixedly secured to the inner surface of the housing 21 while permitting passage of fluid thereby. The stop 41 is provided so that sudden surges of fluid do not force the valve 30 from the cylinder 25. Alternatively, an outwardly extending flange could be formed on the outside of the valve 30 on the upstream end 34 thereof.

Figure 3:
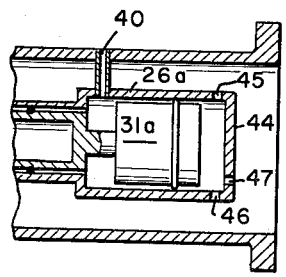
FIGURE 3 is a portion of another flow control device, taken in cross-sectional detail which is a modification of the device shown in FIGURE 2.

In FIGURE 3, another form of the enlarged end of the valve 31a and cylinder 26a is illustrated wherein a plate 44 closes the end of the downstream end of the cylinder 26a trapping fluid therein. The wall of the cylinder 26a is provided near its downstream end with one or more small drain ports 45 and 46. Alternatively, the end plate 44 could be provided with one or more small discharge ports 47 for discharging fluid slowly from the space 48 within the end of the cylinder 26a, thus acting as a dashpot to control the rate of valve movement due to pulsating or rapidly changing flow rates and to reduce any tendency for the valve to "hunt" after a change in flow rate.

To accomplish a reduction in pressure of a production fluid coming from a high pressure well in accordance with the present invention requires the use of a number of steps or stages of pressure reduction. The number of steps of pressure reduction depends on the initial and final pressures, i.e., the well pressure and the pressure at which the separator operates, as well as the ratio of upstream and downstream pressures at each step. For example, in a case where the initial pressure or the pressure of the well was 1,000 p.s.i. absolute, final pressure at the separator being 65 p.s.i.a. and the desired ratio per step 0.707, then a total of eight steps would be required regardless of the volume throughput or flow rate. For a given flow, the size of the openings at each step must be such that the correct pressure differential is maintained. To vary the flow rate, all the openings must be varied if the same pressure differential is to be maintained.

Flow through an orifice or throttling device of the present invention conforms to the flow equation $$Q=CA\sqrt{\Delta P}$$

since $\Delta P$ must be maintained at less than that to produce critical flow (with critical pressure ratio being considered 0.58) and since the flow rate Q is affected by the square root of $\Delta P$, it can be seen that varying of $\Delta P$ produces a relatively small change in flow rate so that in order to maintain the desired pressure ratio at a minimum number of throttling steps it is possible to cause the flow to vary by changing the area or opening of the restriction of each step. The necessity of changing the area or opening of each of the throttling steps for changes in desired flow rate would be difficult and time consuming. Therefore, in accomplishing the method of the present invention it is desired to employ a fluid flow controller as described with regard to FIGURES 2 and 3 wherein the throttling area or opening of each of the flow controller devices is automatically varied so as to maintain the desired ratio, say, 0.707, between the upstream and downstream pressures regardless of the flow rate. The pressure control device of FIGURE 2 controls either upstream or downstream pressures (depending on which is non-varying) so as to maintain a desired ratio between the upstream and downstream pressures so that regardless of flow rate, a critical pressure ratio which would emulsify the fluid is never attained.

In operation, the apparatus of the present invention would operate in the following manner. A typical well in a particular field may have a flowing pressure of 1,000 p.s.i.a. while the flowline or separator pressure is only 65 p.s.i.a. When a conventional single step flow control device, such as a choke, is employed, the ratio of an initial and final pressures is $65/1,000$ or 0.065, which figure is far below the minimum ratio of 0.58 which must exist to prevent the formation of a tight homogenized emulsion in the event the water is present in the oil.

If the flowline pressure between the well and the separator is to be reduced by pressure reducing devices in steps having a ratio of 0.707, for example, a total of eight steps will be necessary. Since the final pressure is fixed by the separator pressure, a pressure-reducing device such as one described with regard to FIGURE 2 of the drawing is designed to automatically hold back pressure equal to the downstream pressure divided by 0.707.

For example, the downstream pressure at the last step or at the last pressure-reducing device 18 (FIGURE 1) is 65 p.s.i. which automatically causes an upstream or back pressure of 92 p.s.i., the latter pressure becoming the downstream pressure of the next to the last pressure-reducing device in the flowline 16. The upstream pressure of this next to last pressure-reducing device becomes 130 p.s.i.a. and the upstream and downstream pressures for the rest of the pressure-reducing devices 18 in the flowline 16 may be readily calculated with the seventh to the last device holding back a pressure 745 p.s.i.a. Since the devices 18 control pressure only, one of the steps must control the flow rate and for this example a conventional flow control device, such as a fixed choke 15, is employed. Since the well pressure is more or less fixed at 1,000 p.s.i. and the exit or downstream pressure from the choke is fixed at 745 p.s.i., the rate of flow depends on the size of the opening in the flow controller or choke 15.

The automatic pressure control devices 18 automatically are positioned to cause their respective openings to produce the designed pressure ratio for the flow rate, automatically taking into account the increase in volume within the flowline due to expansion or pressure reduction. The rate of flow may be varied by merely changing the opening of the flow controller 15. Should the well pressure decline to that of the first automatic pressure control device adjacent the well, it could be bypassed by use of a suitable bypass line (not shown) or it could be removed from the flowline so that there would only be seven steps of pressure reduction including that of the flow control device 15. Conversely, in the event that the separator pressure is reduced to say 46 p.s.i.a., with no change in well pressure, an additional automatic pressure-reducing device would be required and installed in the flowline to make a total of nine steps. The pressure ratio of 0.707 given in the above example is merely one which is selected at random for illustration purposes, it being understood that any pressure ratio above 0.58 to 0.52 could be employed.

The automatic pressure control device illustrated in FIGURE 2 of the drawing consists of a floating sleeve type valve which has two areas acted upon by line pressures. The area acted upon by the upstream pressure is 0.707 times that acted upon by the downstream pressure. The sleeve valve 30 moves to a point where the ports 33 in the valve and the ports 27 in the valve cylinder 25 are positioned such that the opening through the two ports is restricted whereby the upstream pressure is throttled or reduced so that the downstream pressure is 0.707 times that of the upstream pressure, and the forces acting to move the sleeve are exactly balanced for the particular flow rate. In the event that the flow rate changes, the sleeve valve 30 automatically repositions itself to permit the valve to pass the new volume of fluid with the same 0.707 ratio between the upstream and downstream pressures. The valve 30 and cylinder 25 are preferably designed so that they are replaceable, thus permitting utilizing valves and cylinders with various sizes and shapes of port openings to meet the flowing conditions, as well as being able to substitute valves having different areas exposed to the upstream and downstream pressures so that other pressure ratios across the flow controller may be obtained. The automatic pressure controlling device of the present invention is superior to any manually adjusted system since all wells do not produce at uniform rates but in surges due to slugs of gas, oil and water which appreciably affect the instantaneous flow rate.

I claim as my invention:

1. A method of producing a multi-phase emulsifiable fluid of gas, oil and water from a high-pressure well to a low-pressure separator apparatus without substantial emulsification of said multi-phase fluid, said method comprising the steps of containing a multi-phase emulsifiable well production fluid under pressure within a well open to at least one high-pressure formation, discharging a continuously flowing flow stream of said multi-phase production fluid from said well, controlling the rate of flow of said flow stream, reducing the pressure of said flow stream between said well and said separator by a plurality of stepwise stages, controlling the rate of pressure reduction in said plurality of stepwise stages wherein the ratio of the pressure downstream of each stage to the pressure upstream thereof is at least 0.58.

2. Apparatus for reducing the pressure of a fluid flow stream in a pipeline and controlling the upstream-downstream pressure ratio across said apparatus independent of flow rate, said apparatus comprising a housing having inlet and outlet fluid port means in communication with upstream and downstream portions of a pipeline, transverse plate means in said housing normal to the the flow stream therethrough, a cylinder extending through said transverse plate means at least on the downstream side thereof, fluid port means through the wall of said cylinder on the downstream side of said transverse plate means, valve means having fluid pressure actuatable areas and fluid port means adapted to register with the fluid port means in said cylinder, and being carried within said housing for varying the effective area of said port means, said valve means having one of its pressure-actuatable areas exposed to downstream pressure and another of its pressure actuatable areas exposed to upstream pressure and smaller than said area exposed to said downstream pressure, seal means between said valve means and said cylinder downstream of the fluid port means in said cylinder and said valve means, said seal means isolating a space within said cylinder and around said valve, and conduit means in communication between said space outside said housing and an area of said valve equal to the difference in the areas exposed to said upstream and said downstream pressures.

3. Apparatus for reducing the pressure of a fluid flow stream in a pipeline and controlling the upstream-downstream pressure ratio across said apparatus independent of a flow rate, said apparatus comprising a housing having inlet and outlet fluid port means in communication with upstream and downstream portions of a pipeline, transverse plate means in said housing normal to the flow stream therethrough, a cylinder extending through said transverse plate means at least on the downstream side thereof, fluid port means through the wall of said cylinder on the downstream side of said transverse plate means, valve means having fluid pressure actuatable areas and being movably carried within said cylinder for varying the effective area of said port means, said valve means being hollow and having its downstream end closed, fluid port means through the wall of said valve means at least partially in register normally with the port means of said cylinder, said valve means having one of said fluid pressure actuatable areas exposed to downstream pressure and the other of said fluid pressure actuatable areas exposed to upstream pressure, said area exposed to upstream pressure smaller than said area exposed to said downstream pressure, seal means between said valve means and said cylinder downstream of the fluid port means in said cylinder and said valve means, said seal means isolating a space within said cylinder and around said valve, and conduit means in communication between said isolated space and the space outside said housing, there being exposed within said isolated space an area of said valve equal to the difference in the areas exposed to said upstream and said downstream pressures.

4. Apparatus for reducing the pressure of a fluid flow stream in a pipeline and controlling the upstream-downstream pressure ratio across said apparatus independent of flow rate, said apparatus comprising a housing having inlet and outlet fluid port means in communication with upstream and downstream portions of a pipeline, transverse plate means in said housing normal to the flow stream therethrough, a cylinder extending through said transverse plate means at least on the downstream side thereof, fluid port means through the wall of said cylinder on the downstream side of said transverse plate means, valve means having fluid actuatable areas and being movably carried within said cylinder movable for varying the effective area of said port means, said valve means being hollow and having its downstream end enclosed, fluid port means through the wall of said valve means at least partially in register normally with the port means of said cylinder, said valve means having one of said fluid pressure actuatable areas exposed to downstream pressure and the other of said fluid pressure actuatable areas exposed to upstream pressure, said area exposed to upstream pressure being smaller than said area exposed to said downstream pressure, seal means between said valve means and said cylinder downstream of the fluid port means in said cylinder and said valve means, said seal means isolating a space within said cylinder and around said valve, conduit means in communication between said isolated space and the space outside said housing, there being exposed within said isolated space an area of said valve equal to the difference in the areas exposed to said upstream and said downstream pressures, stop means within said housing for limiting the travel of said valve means, and dash-pot means secured to said valve means within said housing for controlling the rate of movement of said valve means.

References Cited in the file of this patent

UNITED STATES PATENTS

| | | |
|---|---|---|
| 1,157,903 | Reynolds | Oct. 26, 1915 |
| 2,005,813 | Thorsen | June 25, 1935 |
| 2,104,328 | Kotzebue | Jan. 4, 1938 |
| 2,245,210 | McElwaine | June 10, 1941 |
| 2,316,383 | Abercrombie | Apr. 13, 1943 |
| 2,664,106 | Livers | Dec. 29, 1953 |
| 2,831,493 | Richmond | Apr. 22, 1958 |